March 27, 1934.  G. F. HORTON  1,952,986
DUMPING TRUCK
Filed Jan. 25, 1932
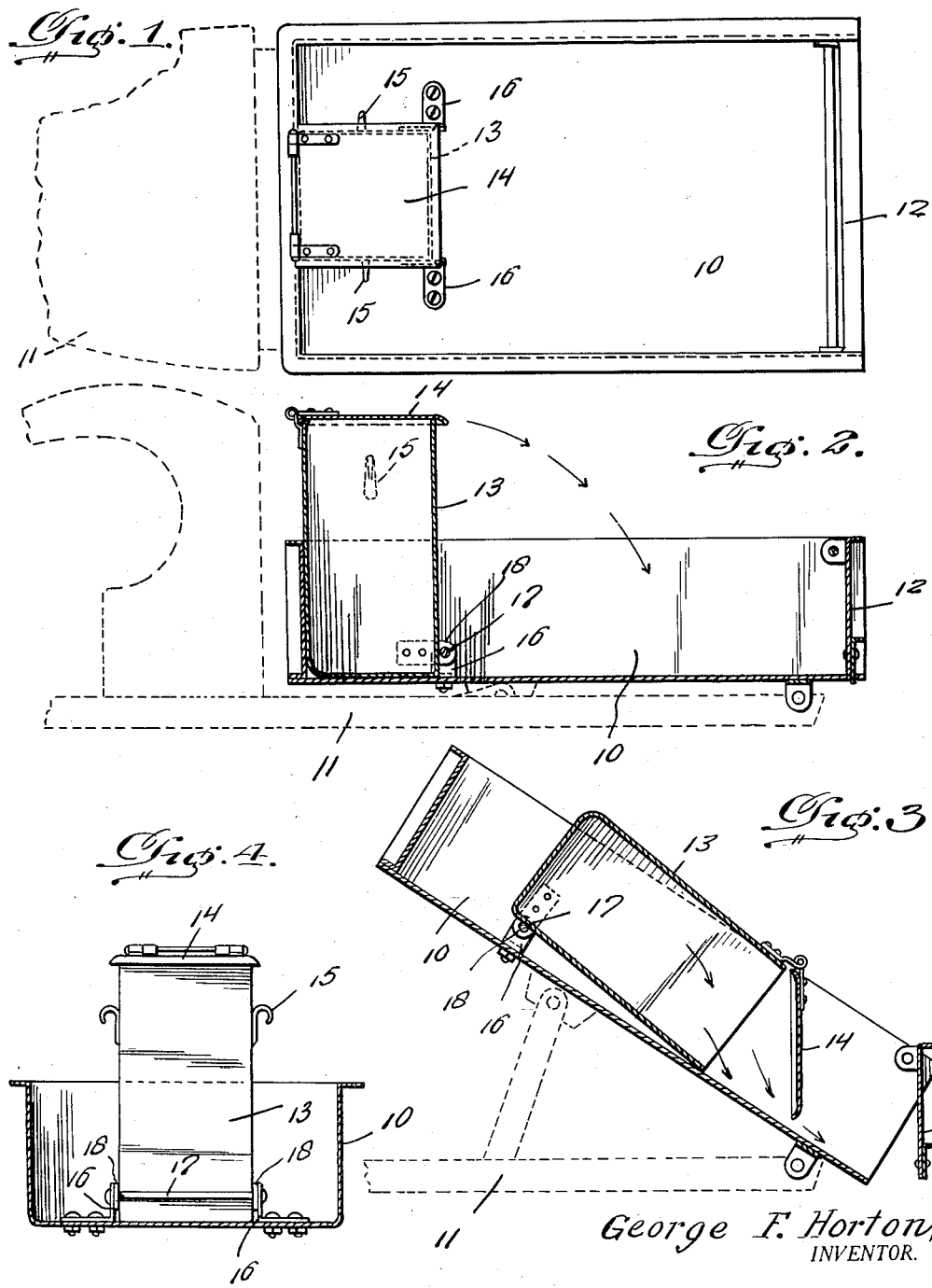
George F. Horton, INVENTOR.
BY J. Stanley Burch
ATTORNEY.

Patented Mar. 27, 1934

1,952,986

UNITED STATES PATENT OFFICE 1,952,986

DUMPING TRUCK

George F. Horton, Houston, Tex.

Application January 25, 1932, Serial No. 588,726

3 Claims. (Cl. 298—8)

The present invention relates to dumping trucks of the character employed for delivering batches of material to a concrete mixer, and comprehends the provision of a tank for the reception of dry cement, mounted within the truck body to automatically assume a dumping position incident to the tilting of the truck body to its dumping position.

In carrying out the invention I provide a cement receiving tank constructed to be quickly and conveniently placed within or removed from a truck body, and mounted to gravitate to a dumping position when the truck body is tilted, and to assume a greater degree of inclination with respect to the ground than that assumed by the truck body, thereby assuring a quick and complete delivery of its contents to the cement mixer.

In accordance with the invention, the cement receiving tank is adapted to be filled from the top when occupying its normal upright position, and provided with a hinged cover to protect the cement from moisture, but which automatically opens as the tank gravitates to its dumping position.

The nature and advantages of the invention will be better understood when the following detail description is read in connection with the accompanying drawing, the invention residing in the construction, combination and arrangement of parts as claimed.

In the drawing forming part of this application like numerals of reference indicate similar parts in the several views and wherein:

Figure 1 is a top plan view of a truck body showing the normal position of the cement receiving tank.

Figure 2 is a vertical sectional view therethrough.

Figure 3 is a sectional view through the truck body and tank showing the same in their dumping positions.

Figure 4 is a transverse section through the truck body showing the tank in elevation.

Referring to the drawing in detail, 10 indicates a truck body of any conventional type employed for handling batches of sand and gravel and conveying the same to a concrete mixer. The truck body is of course mounted on the chassis 11 in any suitable manner to be tilted to a dumping position as illustrated in Figure 3. The body is also provided with the usual tail gate 12.

The present invention resides in the provision of a tank adapted to receive and transport cement with the sand and gravel, and automatically deliver the same to a concrete mixer when the truck body is tilted to its dumping position. The tank indicated at 13 may be constructed from any suitable material, preferably some light metal, and can also vary in size and configuration without departing from the inventive idea. The tank is open at its top and provided with a hinged cover 14, the edges of which project beyond the walls of the tank and are slightly curved downwardly to direct rain water therefrom, and maintain the cement contained within the tank in a dry condition while being transported. Carried by the sides of the tank are hooks 15 utilized to facilitate placing of the tank within the truck body or its removal therefrom.

As clearly illustrated, the tank normally assumes an upright position resting upon the bottom of the truck body adjacent one end thereof, and pivoted with relation thereto to gravitate to a dumping position incident to the tilting of the truck body. The tank is filled from the top when in upright position after which the cover is closed but not latched. The tank may be tiltably mounted in the truck body in any suitable manner, but I preferably employ a pair of spaced brackets 16 attached to the bottom of the truck at opposite sides of the tank. These brackets rise an appreciable distance above the truck bottom to receive the pivot 17 supported on the tank by brackets 18 secured to the opposite sides thereof. The brackets 18 project beyond the adjacent wall of the tank an appreciable distance above the bottom thereof to insure a quick and complete delivery of the contents of the tank when the latter assumes its dumping position. In other words, when the truck body is tilted to its dumping position, the tank gravitates to its horizontally inclined dumping position, but assumes a greater degree of inclination to the ground than that assumed by the bottom of the truck body. This is clearly illustrated in Figure 3. Furthermore the tank dumps its contents adjacent the rear end of the truck body, and therefore prevents the cement from sticking thereto. The invention not only protects the cement from the elements while being transported, but also saves both time and labor in dumping of the batch of materials into the concrete mixer. It will be noted that the brackets 16 are attached to the bottom of the truck body by bolts and nuts, which permits the tank to be easily placed within or removed from any truck body of the character mentioned.

While it is believed that from the foregoing description the nature and advantages of the invention will be readily apparent, I desire to have it understood that I do not limit myself to what is herein illustrated or described and that such changes may be resorted to when desired as fall within the scope of what is claimed.

What is claimed is:

1. The combination with a truck body tiltable for dumping and having a tail gate, of an open-top receptacle arranged in the truck body and normally resting in an upright position upon the bottom of the latter, and means pivotally mounting said receptacle upon the bottom of the truck body for rearward tilting movement upon a transverse axis located at the rear of and slightly above the bottom of said receptacle so that the latter is automatically tilted by gravity to a rearwardly inclined dumping position with its bottom elevated above the bottom of the truck body and with its open end resting on the bottom of the truck body when said truck body is tilted to dumping position.

2. The combination with a truck body tiltable for dumping and having a tail gate, of an open-top receptacle arranged in the truck body and normally resting in an upright position upon the bottom of the latter, means pivotally mounting said receptacle upon the bottom of the truck body for rearward tilting movement upon a transverse axis located at the rear of and slightly above the bottom of said receptacle so that the latter is automatically tilted by gravity to a rearwardly inclined dumping position with its bottom elevated above the bottom of the truck body and with its open end resting on the bottom of the truck body when said truck body is tilted to dumping position, and a lid for the top of said receptacle hinged to the front wall of the latter to automatically swing rearwardly to an open position when the truck body and the receptacle are tilted.

3. The combination with a tilting truck body having a tail gate, of an open-top receptacle arranged in the truck body and normally resting in an upright position upon the bottom of the latter, means pivotally mounting said receptacle in the truck body for rearward tilting movement upon a transverse axis at the rear of and slightly above the bottom of said receptacle so that the latter is automatically tilted to a position with its bottom elevated above the bottom of the truck body and with its upper end resting on the bottom of the truck body when said truck body is tilted, said receptacle mounting means including brackets detachably secured upon and rising above the bottom of the truck body at opposite sides of the receptacle, and rearwardly projecting brackets attached to the sides of the receptacle and pivoted at their rear ends to the upper ends of the first-named brackets.

GEORGE F. HORTON.